E. L. KELLAN.
AUTOMATIC VALVE DEVICE FOR DISTRIBUTING LIQUID UNDER PRESSURE.
APPLICATION FILED JAN. 5, 1914.
1,218,567.
Patented Mar. 6, 1917.
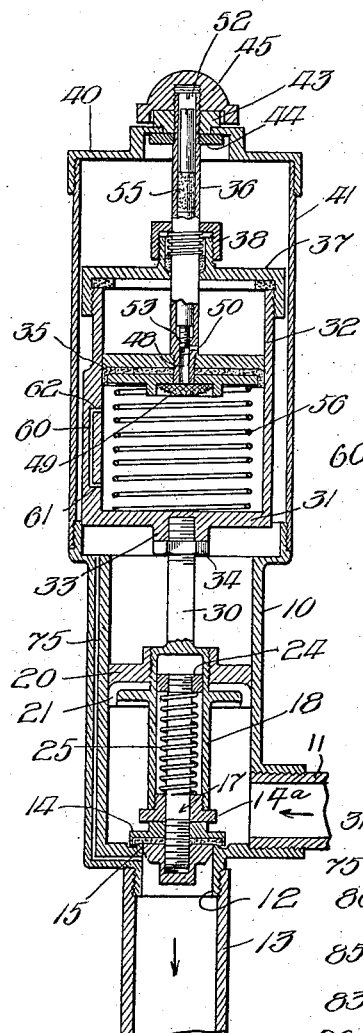
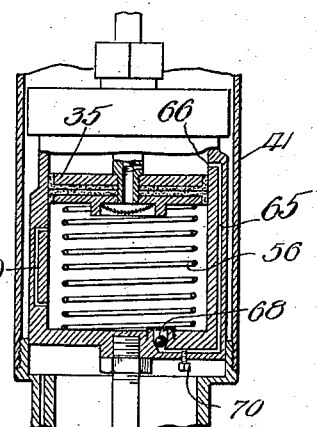
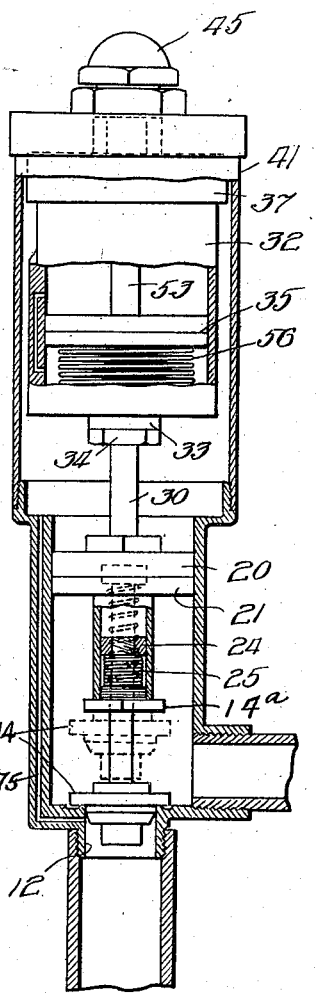
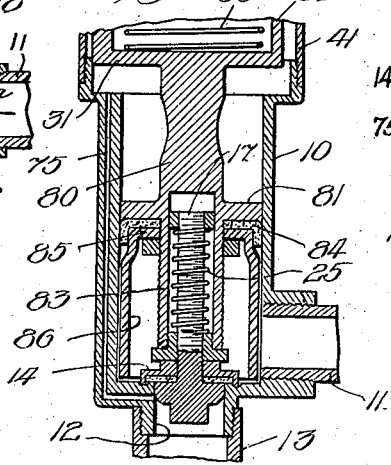
Witnesses:
Harry S. Gaither
Gertrude E. Dowle
Inventor
Edward L. Kellan
by William L. Hall,
Atty

UNITED STATES PATENT OFFICE.

EDWARD L. KELLAN, OF CHICAGO, ILLINOIS.

AUTOMATIC VALVE DEVICE FOR DISTRIBUTING LIQUID UNDER PRESSURE.

1,218,567.  Specification of Letters Patent.  Patented Mar. 6, 1917.

Application filed January 5, 1914. Serial No. 810,388.

*To all whom it may concern:*

Be it known that I, EDWARD L. KELLAN, a citizen of the United States, and a resident of Chicago, in the county of Cook and State of Illinois, have invented certain new and useful Improvements in Automatic Valve Devices for Distributing Liquid Under Pressure; and I do hereby declare that the following is a full, clear, and exact description thereof, reference being had to the accompanying drawings, and to the characters of reference marked thereon, which form a part of this specification.

This invention relates to a novel valve device for intermittently and automatically supplying any desired quantity of liquid, at any desired interval from a source of liquid under pressure to a place or places where such liquid is desired for use.

The improvements embodied in my invention refer more specifically to a type of liquid distributing device wherein the thoroughfare between the source supplying the liquid and the place of use for same is controlled by a suitable valve or closure that is actuated or controlled in its opening movement by the pressure of the liquid supplied, such force being applied against a resistance element which acts as a timing device whereby the intervals of supplying liquid and the duration of its supply through the device may be closely regulated. Such resistance or timing element may be, and is herein shown as a cylinder to contain a liquid and a piston therein, the piston and cylinder being relatively reciprocable, and the valve being connected to and movable with the movable part, there being a by-pass through which the liquid is transferred from one side to the other of the piston to control the opening and closing movements of the valve or closure.

Among the objects of the invention is to provide an automatic liquid distributing device of this character wherein the valve that controls the flow of liquid is quickly lifted from its seat a sufficient distance at the instant of the flow of water or other liquid through the device to allow the required amount of liquid to pass therethrough and then to close automatically.

Another object of the invention is to provide an improved means to control the periodic operation of the valve, and also to provide means for allowing the liquid to promptly flow and after a given volume of liquid has been supplied through the device to close promptly.

A further object of the invention is to provide, in a valve device of this character, means whereby the valve is noiselessly seated, and to prevent chattering of the valve on its seat.

Another object of the invention is to provide means to afford an after-fill or seal of water in siphon jet receptacles.

Another object of the invention is to provide a construction and arrangement whereby foreign matter is prevented from lodging on the valve seat.

Other objects of the invention are to improve and simplify liquid controlling mechanism of this character, and the invention consists in the matters hereinafter set forth and more particularly pointed out in the appended claims.

In the drawings:—

Figure 1 is a vertical section of a liquid distributing device embodying my invention, showing the controlling valve in its closed position.

Fig. 2 is a similar view, partly in elevation, showing the controlling valve open in the dotted line position and closed in the full line position.

Fig. 3 is a fragmentary axial section of the controlling cylinder and piston, showing a modification.

Fig. 4 is an axial section of the lower part of the distributing device, showing a modification.

Referring first to the construction shown in Figs. 1 and 2, 10 designates a cylinder which is supplied with liquid through a pipe 11, and is provided at its bottom wall with an outlet nipple 12 adapted to receive an outlet pipe 13 which leads to the place of use of the liquid. 14 designates a valve in the cylinder arranged between the pipe 11 and the outlet nipple 12, and adapted, when closed, to engage a seat 15 surrounding the outlet nipple 12. This valve closure and its seat may be made of any usual or preferred type.

The stem 17 of the valve closure 14 extends upwardly through a sleeve 18 within the cylinder 10, which sleeve is attached to and forms part of a motor piston 20 which reciprocates vertically within the cylinder 10, said piston being provided with the usual or any preferred type of packing 21. To the lower end of said sleeve is screw-threaded a collar 14ᵃ through which the valve stem 17 loosely passes and which constitutes a shoulder that normally bears upon the closure 14. The sleeve 18 is closed at its upper end so as to prevent water which may pass upwardly thereinto from finding its way above the motor piston. The motor piston 20 is of larger diameter than the valve closure so that the liquid which enters under pressure the cylinder 10 acts with a differential pressure on the larger surface of the piston with a tendency to open the valve. This tendency is resisted by a checking or timing device, hereinafter to be described. The stem 17 is screw-threaded at its upper end, within the sleeve 18, to receive a nut 24, or other like shoulder, between which and the collar 14ᵃ, or other part fixed to the sleeve 18, is interposed a spiral compression spring 25, which acts normally to hold the valve closure 14 against the collar 14ᵃ.

30 designates a stem which is fixed to and extends upwardly from the piston 20 and is rigid at its upper end with the lower wall 31 of a controlling cylinder 32, said lower wall being herein shown as provided with an internally screw-threaded nipple to receive the upper screw-threaded end of the stem 30, a lock nut screw-threaded to the stem serving to lock the stem to the nipple. The cylinder 32 is adapted to be filled with oil or other liquid, which is displaced from one side to the other of a piston 35 upon the relative reciprocation of the cylinder 32 and piston 35, the opposite sides of the displacement piston 35 being connected by a by-pass, hereinafter to be described.

The piston 35 is attached to the lower end of a stem 36 which extends through the upper wall 37 of the displacing cylinder 32, a stuffing box 38 of any suitable construction being provided between the stem 36 and the upper wall 37. Said stem 36 is fixedly connected at its upper end to the top wall 40 of an exterior shell 41 which surrounds and incloses the controlling cylinder 32 and is interiorly screw-threaded at its lower end to fit an exterior screw-thread at the upper end of the cylinder 10. As herein shown, the said stem 36 is fixed to the upper wall 40 of the shell 41 through the medium of upper and lower lock nuts 43, 44, which engage the top and bottom surfaces, respectively, of the wall 40; and the nut 43 may be locked in position by the lock nut 45 that is screw-threaded to the upper exposed end of the stem 36 and is adapted to bear against the upper lock nut 43. Said lock nut is formed with an extension or apron to inclose the nut 43.

The by-pass through which liquid in the controlling cylinder 32 is displaced from one side to the other of the piston 35 is herein shown as formed in the lower end of the stem 36, said stem being made hollow in its part which extends through the piston 35 to communicate with the lower portion of the cylinder 32, and said lower end of the hollow stem may be protected by a screen 49. The said hollow or tubular portion 48 of the stem has a lateral opening 50 which opens into the cylinder 32 above the piston 35. Therefore, upon relative reciprocation of the piston 35 and cylinder 32, the check or dampening fluid in the cylinder passes through the by-pass from one side to the other of the piston; and the velocity of the flow of liquid through this by-pass determines the speed at which the valve controlling device operates. The velocity of the flow through the by-pass, and the consequent activity of the checking or controlling device, may be controlled by means of a rod 52 that is inclosed within the hollow stem 36 and is screw-threaded at 53 to said stem, with its lower end adapted to more or less obstruct the lateral port or passage 50, as clearly shown in Fig. 1. The upper end of said rod 52 is slotted to receive an implement, as a screw driver, whereby it may be adjusted. Said rod may be surrounded by a packing gland 55, shown in Fig. 1, to prevent the passage of the controlling oil or other liquid from the cylinder 32 between the same and the hollow stem 36.

Interposed between the bottom wall 31 of the cylinder and the said displacing or controlling piston 35 is a spiral expansion spring 56, which tends to force the bottom wall of the cylinder away from the piston 35, or vice versa, and which is shown as compressed, as shown in Fig. 2, when the cylinder 32 moves upwardly.

The normal position of the parts of the fluid controlling mechanism is shown in Fig. 1, wherein the liquid thoroughfare therethrough is closed. Inasmuch as the lower face of the motor piston 20 is of greater diameter than the closure 14, the pressure of the liquid, which is introduced into the cylinder 10 through the pipe 11 tends to raise the motor piston 10 while holding the valve closure at the outlet until the spring 25 is compressed. When the differential pressure acting on the motor piston and valve closure is sufficient to overcome the energy in the spring 25, or when the spring is closed upon itself so that the valve closure partakes of the movement of the motor piston and the closure is lifted off its seat and the pressure on the upper and lower sides equalized, said spring acts to suddenly lift the valve closure a sufficient distance to permit free flow of fluid through the outlet passage of the device. This movement of the motor piston is opposed by the resistance afforded by the displacing piston 35 and the liquid within the cylinder 32. By reason of the provision of the by-pass in said piston said cylinder 32 is gradually raised as the oil or other liquid in the cylinder 32 is displaced from the lower to the upper side of the displacing piston. However, by reason of the yielding or spring connection of the valve closure with the motor piston, the said valve closure is not lifted off its seat at the beginning of the rising movement of the motor piston 20; but when the pressure of the liquid acting against the motor piston is such as to overbalance the force of the spring 25, which yieldingly connects the piston 20 with the valve closure 14, or to close the spring upon itself so that the closure moves with the motor piston and is thereby lifted from its seat, the said closure is opened suddenly and raised a sufficient distance from its seat by the spring 25 so as to permit the liquid to flow freely and in ample volume from the inlet pipe 11 to the outlet pipe 13 during the period when the valve subsequently closes under the action of the spring 56.

As a further improvement I provide a by-pass auxiliary to the main by-pass afforded by the axial opening 48 of the stem 36 and the lateral port 50, so arranged as to release the braking effect of the controlling device in the latter part of the movement of the cylinder 32 and thereby "speed up" the movement of the motor piston and facilitate the opening of the valve. This auxiliary by-pass embraces a vertical passage 60, herein shown as formed in one side wall of the cylinder 32, and having a port 61 that communicates with the cylinder 32 a suitable distance below the lowermost position of the piston 35 therein, and an upper port 62 which communicates with the cylinder 32 above the lowermost position of the said piston 35 in the cylinder. When the pressure of the fluid, acting through the inlet pipe 11 and operating on the piston 20, gradually raises the said piston and places a tension on the spring 25, the cylinder 32 is gradually raised with respect to the fixed piston 35. When the upper port 62 of the auxiliary by-pass is raised above the piston 35, the flow of liquid from the lower to the upper part of the cylinder 32 and past the piston 35 is accelerated so as to thereby accelerate the speed of the movement of the cylinder 32 under the constant head through the inlet passage 11. This acceleration of the speed of the cylinder 32 imparts a sudden jerk or pull to the piston 20 and the valve closure 14, and the parts are so proportioned that this accelerated movement of the cylinder 32 occurs at about the time that the pressure on the under side of the piston 20 is at a point to overcome the spring 25. Therefore, the accelerated speed of the parts is so correlated to the stored energy in the spring 25 as to suddenly lift the valve closure 14 from its seat a sufficient distance to insure free flow of liquid through the valve controlled thoroughfare of the valve device.

After the valve closure has been thus lifted from its seat, the pressure on the under side of the motor piston 20 is released, by reason of the out flow of fluid through the pipe 13. Thereafter, the weight of the valve closure 14, the piston 20 and the cylinder 32, acting in conjunction with the stored up energy of the spring 56 (which latter is compressed during the opening movement of the valve) serves to reseat the valve closure 14. The reseating movement is comparatively prompt.

If desired, the closing movement of the valve may be further accelerated by means of a by-pass 65 in the wall of the cylinder 32 which opens at its upper end through a port 66 in the cylinder above the displacing piston 35 and opens at its lower end into the lower end of said cylinder and below the piston 35 through a port 68 that is controlled by a downwardly closing check valve 69. This check valve 69 closes the by-pass 65 when the cylinder 32 is moving upwardly, but permits free communication between the upper and lower ends of the cylinder 32 when the valve is moving to its closed position. The flow of fluid through this by-pass 65 may be regulated by screw-threaded throttle devices 70, as shown in Fig. 3, whereby the duration of the closing movement of the valve may be regulated.

A spill-way 75 is provided, the upper or receiving end of which opens at the top of said cylinder and the lower or discharge end of which opens into the outlet nipple 12 below the closure 14. This spillway is provided to permit liquid which may leak past the piston 20 to escape the outlet pipe 13. In the present construction the spillway is shown as formed in or at the vertical wall of the cylinder 10, but may be otherwise arranged to produce the same result.

In the modification shown in Fig. 4, the stem 80 (corresponding to the stem 30 of the previously described construction) is shown as made integral with the lower wall 31 of the cylinder 32 and the motor piston flange 81 is shown as made integral with said stem. The stem is made hollow to constitute a sleeve 83 to receive the stem 17 of the valve 14 and the spring 25 which controls the movement of said valve. A packing cup or leather 84, constituting part of said motor piston, is confined between the motor piston flange and a lock nut or ring 85, screw-threaded to the sleeve portion 83 of the stem 80.

In accordance with one phase of my invention the shell or cylinder 10 is provided with a cut off sleeve 86 which is movable vertically with the piston 81 and fits sufficiently loosely therein to permit water to leak comparatively slowly between them. It is open at its lower end and extends, when the valve is closed, below the inlet opening for the pipe 11. Preferably, and as herein shown, said cut-off sleeve is made integral with the lock nut or ring 85, giving to the complete device an inverted cup shaped appearance. During the closing movement of the valve the sleeve substantially cuts off the inlet of liquid before the valve is seated, so as to thereby prevent abrupt and noisy closing of the valve and subsequent chattering or hammering under the influence of the pressure from the source of the liquid supply. This construction also affords an after-fill of liquid in a bowl of a siphon-jet bowl, inasmuch as the water may flow slowly between the sleeve and the shell 10 after the cut-off sleeve has cut off the full flow of the liquid from the inlet opening and before the final seating of the valve; the cut-off sleeve preferably fitting the shell sufficiently loosely to permit slow flow of water between said parts. The said construction also serves to prevent lodgment of foreign matter on the valve seat.

An important feature of the construction shown and described is the arrangement of the sleeve (18, 83) to constitute a chamber to receive the valve stem and its controlling spring 25, which chamber is closed at its upper end and is at all times out of communication with the space above the motor piston (20, 81) and is also out of communication with the outlet side of the valve when the valve closure is closed. This construction and arrangement renders it unnecessary to water pack the valve stem at the collar 14ª, the fit between the parts being only a guiding fit. The valve and its stem are, therefore, free to move relatively to the sleeve and are under the perfect control of the spring 25, which latter is made relatively light, to promptly snap the closure open. It is essential that the spring 25 shall be light in action, inasmuch as a heavy spring would afford a connection between the valve and motor piston such as would lift the valve as soon as the piston begins to rise, thus defeating the purpose of the spring.

The structural details of the valve may be varied within the spirit and scope of the invention, and the invention is not limited to the details shown and described except as hereinafter made the subject of specific claims and as imposed by the prior art. For instance, while the spring 25 is preferably arranged within the hollow motor piston stem around the valve stem to bear directly on the valve, it is evident that the spring may be otherwise operatively interposed between the motor piston and valve to produce the same results.

I claim as my invention:

1. Pressure controlled means for intermittently and automatically supplying liquid from a source of liquid under pressure, embracing a cylinder provided with inlet and outlet passages, a valve between them provided with a solid stem, a check controlled motor piston therefor of larger diameter than the valve reciprocating in the cylinder and subject to the pressure of the liquid supply, packing between said piston and cylinder, a closed tubular member of smaller diameter than the piston connected to and depending from said piston and provided with an internal shoulder, and into which said stem loosely extends and against the end of which the valve is adapted to engage, a shoulder on the stem and a compression spring surrounding the stem and interposed between said shoulders on said stem and sleeve.

2. Pressure controlled means for intermittently and automatically supplying liquid from a source of liquid under pressure, embracing a cylinder provided with inlet and outlet passages, a valve between them provided with a stem, a check controlled motor piston therefor of larger diameter than the valve reciprocating in the cylinder and subject to the pressure of the liquid supply, packing between said piston and cylinder, a closed tubular member connected to and depending from said piston and provided with an internal shoulder, and into which said stem loosely extends, a shoulder on the stem, a compression spring surrounding the stem and interposed between said shoulders on said stem and sleeve and a cut-off sleeve movable with the motor piston loosely fitting within said cylinder with its open end so related to the inlet passage and said valve as to substantially cut off the flow of liquid through the valve prior to the seating of the valve.

3. A pressure controlled device for intermittently and automatically supplying liquid from a source under pressure embracing a cylinder 10 provided with inlet and outlet openings, a valve 14 to control the outlet opening having a solid stem 17, a check controlled motor piston 18, of larger diameter than the valve, in said cylinder subject to the pressure of the liquid supply and having a packing fit with the wall of said cylinder, a small centrally disposed tubular member 18 depending from said piston and out of communication with said outlet when the valve is closed, and upwardly into which the stem of said valve loosely extends and against the lower end of which the valve is adapted to be spring-held and provided at its lower end with a shoulder, a spring 25 interposed between said shoulder and a shoulder on the valve stem arranged to permit initial relative movement of the piston and valve and to quickly raise the valve away from its seat near the limit of movement of said piston, a checking device above said piston and a centrally disposed stem 30 connecting said checking device to said piston.

4. A pressure controlled device for intermittently and automatically supplying liquid from a source under pressure embracing a cylinder 10 provided with inlet and outlet openings, a valve 14 to control the outlet opening having a solid stem 17, a check controlled motor piston 18, of larger diameter than the valve, in said cylinder subject to the pressure of the liquid supply and having a packing fit with the wall of said cylinder, a centrally disposed tubular member 18 depending from said piston and out of communication with said outlet when the valve is closed, and upwardly into which the stem of said valve loosely extends and provided at its lower end with a shoulder, a spring 25 interposed between said shoulder and a shoulder on the valve stem arranged to permit initial relative movement of the piston and valve and to quickly raise the valve away from its seat near the limit of movement of said piston, a checking device above said piston, a centrally disposed stem 30 connecting said checking device to said piston, and a cut-off sleeve 86 connected to and movable with said motor piston loosely fitting within the cylinder and movable across the inlet opening, with its lower end so related to the inlet opening and valve seat as to cut off said inlet opening prior to the seating of the valve.

5. Pressure controlled means for intermittently and automatically supplying liquid from a source of liquid under pressure comprising a thoroughfare for the liquid embracing as a part thereof a valve seat; a valve engaging said seat to control said thoroughfare, motor means acted upon by the differential pressure of the liquid against the motor means and valve to open the valve, means connecting the motor means and valve to permit the motor means to initially move independently of the valve and thereafter quickly and fully open the valve and constructed to prevent the flow of water through said thoroughfare until the valve has thus been quickly lifted, combined with means connected to and movable with the motor means to substantially cut off the flow of liquid through the thoroughfare prior to the seating of the valve.

In testimony, that I claim the foregoing as my invention I affix my signature, in the presence of two witnesses, this 29th day of December, A. D. 1913.

EDWARD L. KELLAN.

Witnesses:
W. L. HALL,
G. E. DOWLE.